United States Patent
Mesard et al.

(10) Patent No.: US 7,707,359 B2
(45) Date of Patent: Apr. 27, 2010

(54) METHOD AND APPARATUS FOR SELECTIVELY PREFETCHING BASED ON RESOURCE AVAILABILITY

(75) Inventors: Wayne Mesard, Belmont, MA (US); Paul Caprioli, Santa Clara, CA (US)

(73) Assignee: Oracle America, Inc., Redwood Shores, CA (US)

( * ) Notice: Subject to any disclaimer, the term of this patent is extended or adjusted under 35 U.S.C. 154(b) by 187 days.

(21) Appl. No.: 11/390,896

(22) Filed: Mar. 27, 2006

(65) Prior Publication Data

US 2007/0136534 A1 Jun. 14, 2007

Related U.S. Application Data

(60) Provisional application No. 60/749,144, filed on Dec. 9, 2005.

(51) Int. Cl.
*G06F 12/00* (2006.01)

(52) U.S. Cl. .............................. 711/137; 711/E12.004; 711/E12.057

(58) Field of Classification Search .................. 711/137
See application file for complete search history.

(56) References Cited

U.S. PATENT DOCUMENTS 6,647,487 B1 * 11/2003 Undy et al. ................. 712/207
6,820,173 B1 * 11/2004 Bittel et al. ................. 711/137
2002/0144054 A1 * 10/2002 Fanning et al. ............. 711/108
2003/0079089 A1 * 4/2003 Barrick et al. .............. 711/137
2004/0039477 A1 * 2/2004 Kaever et al. ............... 700/173
2006/0224860 A1 * 10/2006 Colavin et al. .............. 712/207

* cited by examiner

*Primary Examiner*—Reginald G Bragdon
*Assistant Examiner*—Aracelis Ruiz
(74) *Attorney, Agent, or Firm*—Park, Vaughan & Fleming LLP; Anthony P. Jones

(57) ABSTRACT

One embodiment of the present invention provides a system which facilitates selective prefetching based on resource availability. During operation, the system executes instructions in a processor. While executing the instructions, the system monitors the availability of one or more system resources and dynamically adjusts an availability indicator for each system resource based on the current availability of the system resource. Upon encountering a prefetch instruction which involves the system resource, the system checks the availability indicator. If the availability indicator indicates that the system resource is not sufficiently available, the system terminates the execution of the prefetch instruction, whereby terminating execution prevents prefetch instructions from overwhelming the system resource.

17 Claims, 2 Drawing Sheets

METHOD AND APPARATUS FOR SELECTIVELY PREFETCHING BASED ON RESOURCE AVAILABILITY

RELATED APPLICATION

This application hereby claims priority under 35 U.S.C. section 119 to U.S. Provisional Patent Application No. 60/749,144 filed 9 Dec. 2005, entitled "Method and Apparatus for Selectively Prefetching Based on Resource Availability," by inventors Wayne Mesard and Paul Caprioli.

BACKGROUND

1. Field of the Invention

The present invention relates to techniques for improving computer system performance. More specifically, the present invention relates to a method and apparatus for selectively prefetching based on resource availability.

2. Related Art

Hardware prefetching ("automatic prefetching") and software prefetching ("explicit prefetching") are two well known techniques for enhancing the performance of the caches in computer systems (where "caches" include hardware structures such as data caches, instruction caches and Translation Lookaside Buffers (TLBs)).

In a computer system that uses hardware prefetching, system hardware monitors runtime data access patterns and uses the access patterns to make predictions about future loads and stores. Based on these predictions, the system hardware issues automatic prefetch requests in anticipation of accesses.

In a computer system that uses software prefetching, software applications are tuned by inserting explicit prefetch instructions into the executable code in order to minimize the number of cache misses by subsequent load and store operations. These prefetch instructions can be placed so that they complement the automatic (hardware) prefetch behavior of the processor on which the software is executing.

Using these two techniques should result in significant performance improvement. In practice, however, the techniques have several limitations which significantly reduce the expected performance improvement. In fact, these limitations are so significant that they have impeded the widespread adoption of these techniques.

One such limitation is "processor implementation sensitivity," which occurs because the use of prefetches is highly dependent on the implementation details of the processor on which a software application is running. For example, the sizes of the caches, the number of ways in each cache, the load-to-use latency of a main memory access, and the clock frequency of the processor are processor implementation details that can affect the use of prefetches.

Processor implementation sensitivity is apparent in many commercially available software applications. Because software designers typically deliver only a single executable binary which is designed to be executed on a variety of different processors from the same processor family, the prefetch requests are not optimized for each possible processor implementation. The suppliers (1) choose the most popular variant within the processor family and optimize for that variant, or (2) deliver a binary that is suboptimal for any particular processor variant, but maximizes the average performance gain across the whole family.

A second limitation is "workload insensitivity," which occurs in computer systems where more than one virtual or physical processor is sending prefetch requests to a shared cache. For a single application (or a single execution thread), aggressive prefetching can produce considerable performance gains—because the cache is dedicated to the single application. Unfortunately, in a multi-application system, two or more executables time-share a processor and that processor's caches. In this case, aggressive prefetching by one application can displace the data in the shared cache that another application is actively using. In fact, multiple executables, each performing self-interested prefetching, can cause so much interference in the cache that the resulting performance is significantly worse than if each executable was run sequentially—a phenomenon known as "thrashing in the cache."

A third limitation is "shared resource insensitivity," which occurs because modern processors contain multiple processor cores which share system resources in a complex arrangement. Caches are one example of a system resource that is particularly vulnerable to shared resource complications. Because of the technical difficulties involved with one processor assessing the cache footprints taken up by the other processor cores, each processor core may operate without knowing how much space is available in the cache. Therefore, the processor cores typically restrict the use of aggressive prefetching or risk overloading and thrashing in the cache.

Although cache performance is affected by shared resource insensitivity, caches are not the only system resource affected by this condition. The processor cores also share other resources, such as the system bus. Aggressive speculative prefetching may load these system resources with counterproductive or unnecessary work, hampering the efficient operation of the computer system.

A fourth limitation is "competitive prefetching interference," which occurs in systems that combine hardware and software prefetching. In pathological cases, hardware and software prefetching can actually interfere with each other. Competitive prefetching interference occurs when the software issues prefetch requests which hardware has already issued, or when the false miss rate of the hardware and software prefetching combined exceeds the threshold at which actively used cache lines begin to be evicted, thereby causing cache thrashing.

Hence, what is needed is a method and apparatus which allows prefetching to be used aggressively without causing system-level performance degradation.

SUMMARY

One embodiment of the present invention provides a system which facilitates selective prefetching based on resource availability. During operation, the system executes instructions in a processor. While executing the instructions, the system monitors the availability of one or more system resources and dynamically adjusts an availability indicator, such as a register, for each system resource based on the current availability of the system resource. Upon encountering a prefetch instruction which involves the system resource, the system checks the availability indicator. If the availability indicator indicates that the system resource is not sufficiently available, the system terminates the execution of the prefetch instruction, whereby terminating execution prevents prefetch instructions from overwhelming the system resource.

In a variation of this embodiment, monitoring the availability of a system resource involves monitoring the use of the system resource by two or more virtual or physical processors.

In a variation of this embodiment, the prefetch instruction includes a conditional field which indicates at least one condition under which the prefetch instruction is executed despite the system resource not being sufficiently available.

In a variation of this embodiment, the system performs a just-in-time compilation to set the conditional field of the prefetch instruction at runtime. The term "just-in-time compilation (JIT), also known as dynamic translation, refers to a technique for improving the performance of bytecode-compiled programming systems, by translating bytecode into native machine code at runtime" (see Wikopedia). Just-in-time compilation is commonly performed in JAVA™ programming environments.

In a variation of this embodiment, monitoring the availability of a system resource involves monitoring (1) the availability of cache lines in a cache; (2) the availability of entries in a translation-lookaside-buffer (TLB); (3) the availability of bandwidth on a system bus; (4) the local work level of a component in the computer system; or (5) the global work level of the computer system.

In a further variation, monitoring the availability of the system resource involves using at least one current system activity level to predict when the system resource will become unavailable in the future.

In a variation of this embodiment, adjusting an availability indicator involves setting a least-significant bit of a shift register each time that an instruction uses a monitored system resource, wherein the shift register is shifted by one position each usage interval for the monitored system resource.

In a further variation, checking the availability indicator involves checking (1) the current value of the shift register; (2) a valid indicator associated with the system resource; or (3) a value of a hardware or software performance counter associated with a monitored system resource.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

System

Figure 1:
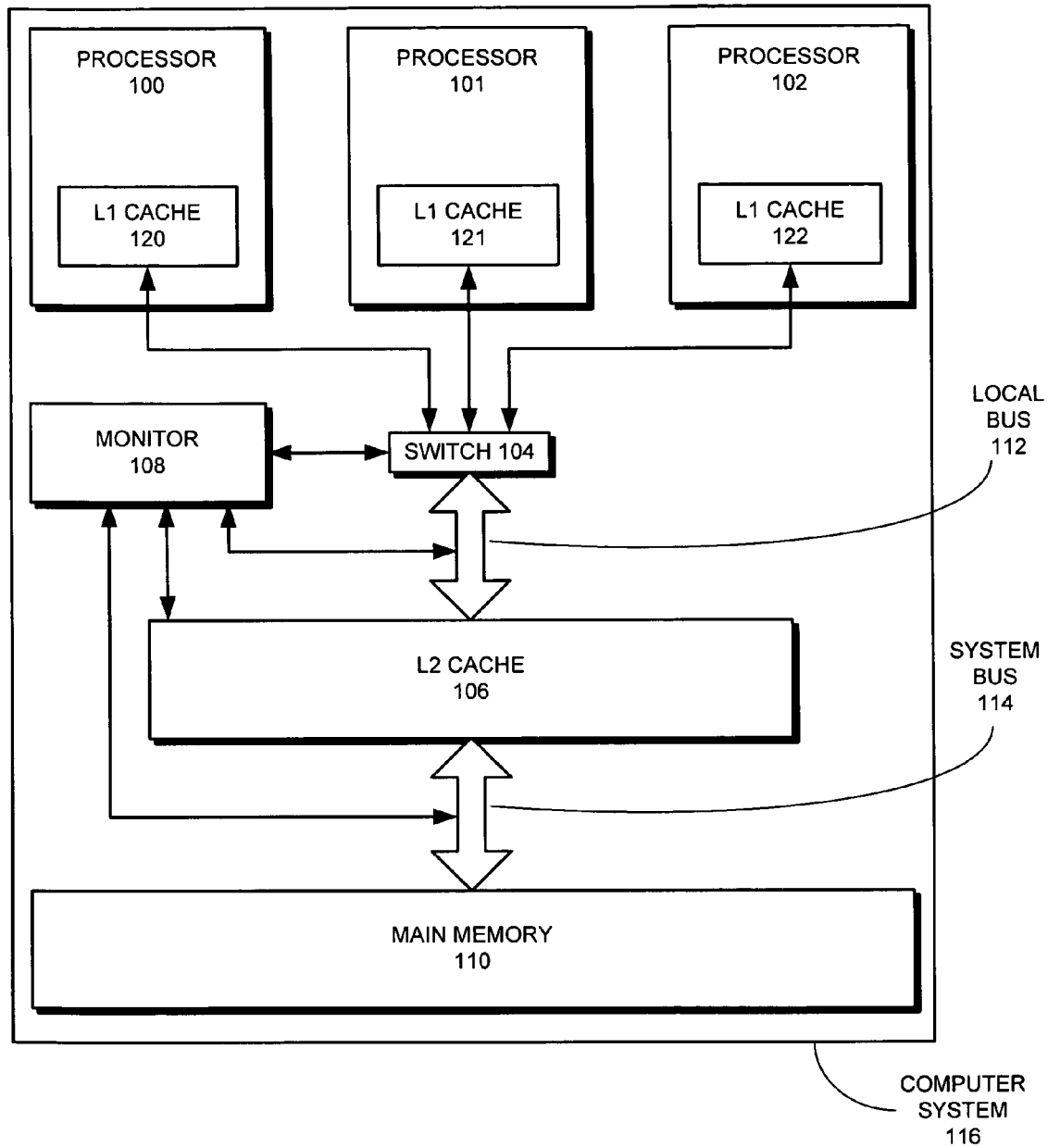
FIG. 1 illustrates a computer system in accordance with an embodiment of the present invention.

FIG. 1 illustrates a computer system in accordance with an embodiment of the present invention. Computer system 116 includes multiple processors 100-102, switch 104, L2 cache 106, and main memory 110. Each processor 100-102 in turn includes an L1 cache 120-122. L1 caches 120-122, L2 cache 106, and main memory 110 collectively form the memory system that holds the instructions and data necessary for the operation of computer system 116. Switch 104 manages the flow of prefetch requests (which prefetch data values from main memory 110 to L2 cache 106). Computer system 116 uses local bus 112 and system bus 114 to transfer data between the system resources in computer system 116.

Monitoring mechanism 108 monitors the current "availability" of computer system 116 resources. For example, monitoring mechanism 108 may monitor the availability of cache lines within a cache, the overall activity level in a cache, the availability of entries in a TLB, or the available bandwidth on system bus 114.

Monitoring mechanism 108 maintains an "availability indicator" corresponding to each monitored system resource. When the availability of a system resource falls below the amount required to effectively service a prefetch request, monitoring mechanism 108 asserts the corresponding indicator.

During the operation of computer system 116, switch 104 intercepts and holds the prefetch requests generated by processors 100-102. Before releasing the prefetch request to main memory 110, switch 104 checks the availability indicators corresponding to the system resources required to service the prefetch request. If an availability indicator is asserted for a system resource required by the prefetch request, switch 104 terminates the prefetch. Terminating the prefetch in this way helps to prevent the processors 100-102 from overwhelming the system resource with prefetch requests.

In one embodiment of the present invention, monitoring mechanism 108 uses a shift buffer as an availability indicator. For example, monitoring mechanism 108 can set the least significant bit of a shift buffer every time a line is allocated in the cache, while continually bit-shifting the shift buffer at a constant rate (e.g., once per clock cycle). At any point in time, the cache is defined as IDLE when all the bits in the shift buffer are zero. Alternatively, the cache is defined as NOT BUSY when some of the bits in the shift buffer are zero.

In another embodiment, monitoring mechanism 108 uses the current value in a performance counter corresponding to a system resource as an availability indicator.

In yet another embodiment, monitoring mechanism 108 uses valid bits corresponding to the to-be-prefetched cache line as an availability indicator. When a processor 100 sends a prefetch, monitoring mechanism 108 examines the valid bits at the index in the cache computed from the to-be-prefetched cache line. If all of the valid bits are set (i.e., every "way" at that index is in use), the cache is BUSY. If at least one of the valid bits is zero, the cache is defined as NOT BUSY. If all of the valid bits are zero, the cache is defined as IDLE.

Monitoring mechanism 108 may also monitor the current activity levels of selected areas of computer system 116 and may use those activity levels to make predictions about the future availability of system resources. For example, monitoring mechanism 108 can monitor activities in a processor 100 to predict when local bus 112 may become busy.

Note that processors 100-102 may be separate physical processors or may be virtual processors within a single CMT processor. Furthermore, switch 104 and monitoring mechanism 108 are described as hardware structures, but in an alternative embodiment switch 104 and monitoring mechanism 108 can be implemented in software.

The Extended Prefetch Instruction

In one embodiment of the present invention, the prefetch instruction is extended to include a conditional field which prevents computer system 116 (see FIG. 1) from terminating the prefetch despite the assertion of the system resource indicators. This field allows a programmer to force the execution of the prefetch in situations where the prefetched data is very likely to be used by a subsequent instruction. For example, the set of available prefetch instructions can include instructions such as:

PREFETCH-FOR-READ-IF-CACHE-IDLE;
PREFETCH-FOR-READ-IF-CACHE-NOT-BUSY;
PREFETCH-FOR-READ-IF-SYSTEM-BUS-IDLE; and
PREFETCH-FOR-READ-IF-SYSTEM-BUS-NOT-BUSY.

In an alternative embodiment monitoring mechanism 108 is designed to work with "legacy code" (code without the extended prefetch instructions). For this embodiment, monitoring mechanism 108 automatically permits legacy prefetch instructions to execute, while monitoring the execution of the extended prefetch instructions.

In one embodiment of the present invention, monitoring mechanism 108 also provides a series of configuration mechanisms which control the response of monitoring mechanism 108 when receiving a prefetch, whether in a system that supports extended prefetch instructions or not. For example, configuration mechanisms can be provided that allow a user to control the level of at which hardware prefetching is permitted and that allow the user to control what system resources is available before switch 104 allows the prefetch to continue.

Prefetching Process

Figure 2:
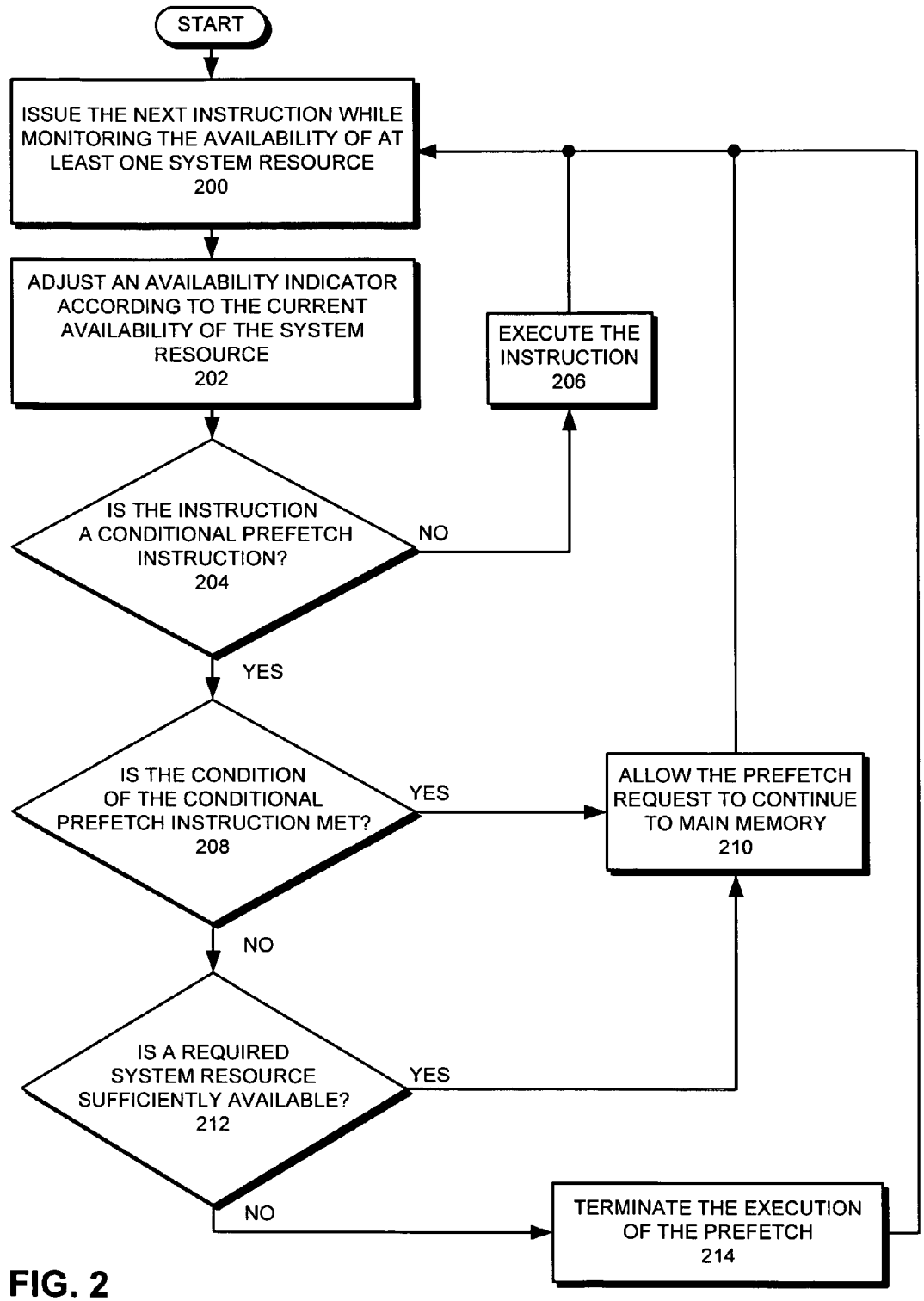
FIG. 2 presents a flow chart illustrating a prefetching process in accordance with an embodiment of the present invention.

FIG. 2 presents a flow chart illustrating a prefetching process in accordance with an embodiment of the present invention. The process starts with a processor 100 (see FIG. 1) issuing instructions while a monitoring mechanism 108 monitors the "availability" of a group of system resources (step 200). During this process, monitoring mechanism 108 dynamically adjusts an availability indicator based on the current availability of each system resource (step 202).

Processor 100 then determines if the issued instruction is a conditional prefetch instruction (step 204). If the issued instruction is not a conditional prefetch instruction, processor 100 executes the instruction (step 206) and returns to step 200 to issue the next instruction in program order.

One embodiment of the present invention uses prefetch instructions which are extended to include a conditional field. For this embodiment, the programmer (or compiler) uses the conditional field to indicate when the prefetch instruction should be sent to main memory 110 despite the fact that one or more system resources required by the prefetch instruction are currently unavailable—thereby "forcing" the prefetch. In an alternative embodiment, the computer system operates with "legacy" prefetch instructions (which do not include the conditional field). For this embodiment, monitoring mechanism 108 automatically permits the execution of legacy prefetch instructions (step 206), while monitoring the execution of conditional prefetch instructions.

If the instruction is a conditional prefetch instruction, processor 100 executes the instruction, thereby sending a prefetch request to main memory 110. Before the prefetch request reaches main memory 110, the prefetch request passes into switch 104. Switch 104 holds the prefetch request while determining if the extended field of prefetch instruction had contained a value that met the necessary condition to force the prefetch request to be sent to main memory (despite the potential unavailability of one or more system resources required by the prefetch request) (step 208). If the forcing condition is met, switch 104 releases the prefetch request to main memory 110 (step 210). Processor 100 then returns to step 200 to issue the next instruction in program order.

If the forcing condition is not met, switch 104 queries monitoring mechanism 108 to determine if the availability indicator is asserted for any system resource required by the prefetch instruction (step 212). An availability indicator is asserted if the system resource is unavailable (too busy) to complete the prefetch request. If monitoring mechanism 108 reports that none of the availability indicators is asserted for system resources required by the prefetch request, switch 104 releases the prefetch request to main memory 110 (step 210). Processor 100 then returns to step 200 to issue the next instruction in program order.

If one or more of the required availability indicators are asserted, switch 104 terminates the execution of the prefetch request (step 214). Processor 100 then returns to step 200 to issue the next instruction in program order.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for facilitating selective prefetching based on system resource availability in a computer system, comprising:

while executing instructions in a processor, monitoring the availability of at least one system resource and dynamically adjusting an availability indicator for the system resource based on a current availability of the system resource;

upon executing a prefetch instruction which generates a prefetch request that involves the system resource, checking the availability indicator; and determining if the availability indicator indicates that the system resource is sufficiently available;

if the system resource is sufficiently available, sending the prefetch request;

otherwise, if the system resource is not sufficiently available, examining a conditional field in the prefetch instruction wherein the conditional field indicates that the prefetch request should be sent to the system resource despite the system resource not being sufficiently available;

if the conditional field indicates that the prefetch request should be sent to the system resource, sending the prefetch request despite the system resource not being sufficiently available, otherwise, terminating the prefetch request;

whereby terminating the prefetch request prevents prefetch requests from overwhelming the system resource.

2. The method of claim 1, wherein monitoring the availability of a system resource involves monitoring the use of the system resource by two or more virtual or physical processors.

3. The method of claim 1, further comprising performing a just-in-time compilation which sets the conditional field of the prefetch instruction at runtime.

4. The method of claim 1, wherein monitoring the availability of a system resource involves monitoring:
the availability of cache lines in a cache;
the availability of entries in a translation-lookaside-buffer (TLB);
the availability of bandwidth on a system bus;
a local work level of a component in the computer system; or
a global work level of the computer system.

5. The method of claim 4, wherein monitoring the availability of the system resource involves using at least one current system activity level to predict when the system resource will become unavailable in the future.

6. The method of claim 1, wherein adjusting an availability indicator involves setting a least-significant bit of a shift register each time that an instruction uses a monitored system resource, wherein the shift register is shifted by one position at each usage interval for the monitored system resource.

7. The method of claim 6, wherein checking the availability indicator involves checking:
the current value of the shift register;
a valid indicator associated with the system resource; or
a value of a hardware or software performance counter associated with a monitored system resource.

8. An apparatus for facilitating selective prefetching based on system resource availability in a computer system, comprising:
an execution mechanism on a processor;
a monitoring mechanism which is configured to monitor the availability of at least one system resource and dynamically update an availability indicator for the system resource based on a current availability of the system resource;
a switching mechanism coupled to the processor, the monitoring mechanism, and a memory; and
wherein the switching mechanism is configured to intercept each prefetch request generated by the execution mechanism, and
wherein the switching mechanism is further configured to determine if the availability indicator indicates that the system resource is sufficiently available, and
if the system resource is sufficiently available, the switching mechanism is configured to send the prefetch request to the system resource,
otherwise, if the system resource is not sufficiently available, the switching mechanism is configured to examine a conditional field in a prefetch instruction wherein the conditional field indicates that the prefetch request should be sent to the system resource despite the system resource not being sufficiently available;
if the conditional field indicates that the prefetch request should be sent to the system resource, the switching mechanism is configured to send the request to the system resource
otherwise, the switching mechanism is configured to terminate the prefetch request
whereby terminating the prefetch request prevents prefetch instructions from overwhelming the system resource.

9. The apparatus of claim 8, further comprising a just-in-time compilation mechanism which is configured to compile the prefetch instructions to set the conditional field at runtime.

10. The apparatus of claim 8, further comprising a prediction mechanism, wherein the prediction mechanism is configured to use at least one current system activity level to predict the future availability of a system resource.

11. A computer-readable storage medium storing instructions that when executed by a computer cause the computer to perform a method for facilitating selective prefetching based on system resource availability in a computer system, the method comprising:
while executing instructions in a processor, monitoring the availability of at least one system resource and dynamically adjusting an availability indicator for the system resource based on a current availability of the system resource;
upon executing a prefetch instruction which generates a prefetch request that involves the system resource, checking the availability indicator; and
determining if the availability indicator indicates that the system resource is sufficiently available;
if the system resource is sufficiently available, sending the prefetch request;
otherwise, if the system resource is not sufficiently available, examining a conditional field in the prefetch instruction, wherein the conditional field indicates that the prefetch request should be sent to the system resource despite the system resource not being sufficiently available;
if the conditional field indicates that the prefetch request should be sent to the system resource, sending the prefetch request despite the system resource not being sufficiently available,
otherwise, terminating the prefetch request;
whereby terminating the prefetch request prevents prefetch requests from overwhelming the system resource.

12. The computer-readable storage medium of claim 11, wherein monitoring the availability of a system resource involves monitoring the use of the system resource by two or more virtual or physical processors.

13. The computer-readable storage medium of claim 11, further comprising performing a just-in-time compilation performing a just-in-time compilation which sets the conditional field of the prefetch instruction at runtime.

14. The computer-readable storage medium of claim 11, wherein monitoring the availability of a system resource involves monitoring the:
availability of cache lines in a cache;
availability of entries in a translation-lookaside-buffer (TLB);
availability of bandwidth on a system bus;
local work level of a component in the computer system; or
global work level of the computer system.

15. The computer-readable storage medium of claim 14, wherein monitoring the availability of the system resource involves using at least one current system activity level to predict when the system resource will become unavailable in the future.

16. The computer-readable storage medium of claim 11, wherein adjusting an availability indicator involves setting a least-significant bit of a shift register each time that an instruction uses a monitored system resource, wherein the shift register is shifted by one position at each usage interval for the monitored system resource.

17. The computer-readable storage medium of claim 16, wherein checking the availability indicator involves checking:
the current value of the shift register;
a valid indicator associated with the system resource; or
a value of a hardware or software performance counter associated with a monitored system resource.

* * * * *